United States Patent

Schuhmacher et al.

[11] 3,906,012
[45] Sept. 16, 1975

[54] PRODUCTION OF 1-AMINOANTHRAQUINONE-2-CARBOXAMIDES

[75] Inventors: Alfred Schuhmacher; Gerd Schwantje, both of Ludwigshafen, Germany

[73] Assignee: BASF Aktiengesellschaft, Ludwigshafen (Rhine), Germany

[22] Filed: Nov. 5, 1973

[21] Appl. No.: 412,562

[30] Foreign Application Priority Data
Nov. 9, 1972 Germany............................ 2254838

[52] U.S. Cl................................................. 260/377
[51] Int. Cl.²................... C07C 103/75; C09B 1/36
[58] Field of Search..................... 260/377

[56] References Cited
UNITED STATES PATENTS

| | | | |
|---|---|---|---|
| 1,871,821 | 8/1932 | Nawiasky et al..................... | 260/377 |
| 2,507,574 | 5/1950 | Olpin et al........................... | 260/377 |
| 2,717,898 | 9/1955 | Ebel et al............................. | 260/377 |
| 3,402,185 | 9/1968 | Maier et al. ........................ | 260/377 |

Primary Examiner—Paul F. Shaver
Attorney, Agent, or Firm—Johnston, Keil, Thompson & Shurtleff

[57] ABSTRACT

Production of amides of 1-aminoanthraquinone-2-carboxylic acid which bear hydrogen, cyclohexylamino, chloro, bromo or nitro as substituent in the 4-position by reaction of 1,2-dihydro-7,8-diphthaloyl-3,1,4H-benzoxazone-4:

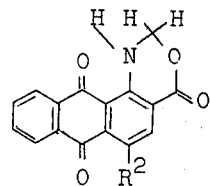

in which $R^2$ is H, Cl, Br, NH-cyclohexyl or $NO_2$, with an aliphatic or cycloaliphatic amine of one to eight carbon atoms in the molar ratio 1:1. Some of the amides are disperse dyes but particularly they are intermediates for the production of disperse dyes.

10 Claims, No Drawings

PRODUCTION OF 1-AMINOANTHRAQUINONE-2-CARBOXAMIDES

The invention relates to a novel process for the production of amides of 1-aminoanthraquinone-2-carboxylic acid.

Amides of 1-aminoanthraquinone-2-carboxylic acid are prepared as a rule from 1-aminoanthraquinone-2-carboxylic acid chlorides by reaction with amines. The acyl chlorides required as starting compounds are obtained in turn from the appropriate carboxylic acids by reaction with inorganic acid chlorides such as thionyl chloride, phosgene, phosphorus trichloride, phosphorus pentachloride or other chlorinating agents. In these chlorination reactions large amounts of hydrogen chloride are set free and in the case of thionyl chloride sulfur dioxide is also liberated. These gases have to be removed from the outgoing air and complete removal can only be achieved at great expense. We have now found that amides of 1-aminoanthraquinone-2-carboxylic acid of the formula:

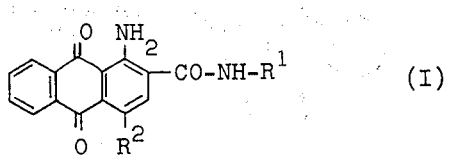

in which $R^1$ is hydrogen, cycloalkyl of five to eight carbon atoms or linear or branched alkyl of one to eight carbon atoms in which one or two hydrogen atoms may be replaced by hydroxyl, alkoxy of one to six carbon atoms or phenyl and the phenyl nucleus may bear alkyl or alkoxy in each case of one to four carbon atoms, chloro or bromo as substituents; and $R^2$ is hydrogen, cyclohexylamino, chloro, bromo or nitro can be prepared by a method which is easy to carry out industrially be reacting a 1,2-dihydro-7,8-diphthaloyl-3,1,4-H-benzoxazone-4 of the formula (II):

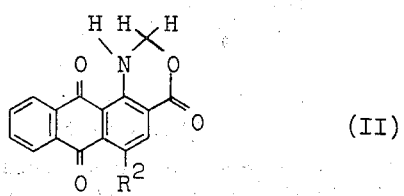

with an amine of the formula $R^1$-$NH_2$     (III)
in which $R^1$ and $R^2$ have the above meanings.

1-aminoanthraquinone-2-carboxamides obtained according to the process of the invention are important dye intermediates. Some of the products are themselves disperse dyes which dye synthetic fibrous materials such as linear polyesters, cellulose acetate or polyamides orange or blue hues.

Examples of linear or branched alkyl for $R^1$ are: methyl, ethyl, n-propyl, isopropyl, n-butyl, isobutyl, n-amyl, isoamyl, n-hexyl, isohexyl, n-octyl, isooctyl, 2-ethylhexyl, β-hydroxyethyl, γ-hydroxypropyl, γ-hydroxypentyl, β, β-diethyl-γ-hydroxypropyl, β, β-dimethyl-γ-hydroxypropyl, β-methoxyethyl, β-ethoxyethyl, β-propoxyethyl, β-butoxyethyl, γ-methoxypropyl, γethoxypropyl, γ-butoxypropyl, β-(β'-hydroxyethoxy)-ethyl, benzyl (phenylmethyl), β-phenylethyl, β-phenylpropyl, δ-phenylbutyl and γ-phenylbutyl.

Examples of cycloalkyl of five to eight carbon atoms for $R^1$ are: cyclopentyl, cyclohexyl, methylcyclohexyl and dimethylhexyl.

The reaction of 1,2-dihydro-7,8-diphthaloyl-3,1,4-H-benzoxazones-4 of the formula (II) (hereinafter referred to as benzoxazones (II)) is conveniently carried out either in an excess of the amine (III) which thus serves at the same time as a solvent or in a solvent which is inert under the reaction conditions. Examples of solvents are: alcohols such as methanol, ethanol, n-propanol, isopropanol, n-butanol, isobutanol, glycols such as ethylene glycol, 1,2-propylene glycol, 1,3-propylene glycol, butanediol-1,3, butanediol-1,4, ethylene diglycol, glycol ethers such as the monomethyl, monoethyl and monobutyl ethers of glycol, monomethyl ethers of ethylene diglycol and ethylene triglycol, ethylene glycol dimethyl ether, aromatic hydrocarbons such as benzene, toluene, xylene, chlorobenzene, dichlorobenzene or nitrobenzene, chlorohydrocarbons such as 1,2-dichloroethane, carbon tetrachloride or trichloroethylene, ethers such as tetrahydrofuran, and also dimethylsulfoxide, tetramethylenesulfone, tetramethylurea, pyridine, picoline, quinoline, water or formamide.

Particularly preferred solvents are strongly polar water-miscible aprotic solvents such as N,N-dimethylformamide, N,N-dimethylacetamide, N,N-dimethylpropionamide, N,N-diethylformamide, N,N-diethylacetamide, N,N-diethylpropionamide, N-methylpyrrolidone, pyridine or mixtures of the same.

The amount of solvent depends on the solvent power and the boiling point of the solvent used. The minimum amount of solvent is determined by the requirement that the reaction mixture should remain capable of being stirred before, during and after the reaction. The amount of solvent used is as a rule twice to ten times that of the benzoxazone (II).

When the reaction is carried out in an excess of the amine (III) the amount of amine used is generally from three to ten times the amount of (II) by weight. The lower limit of the amount of amine is determined by the requirement that the reaction mixture should remain capable of being stirred prior to, during and after the reaction.

When the reaction is carried out in a solvent the amount of amine (III) used is generally at least the stoichiometric amount, i.e. 1 mole of (III) for each mole of (II). It is convenient however to use an excess of from 2 to 10 moles and preferably from 2 to 4 moles of amine per mole of benzoxazone (II).

The reaction temperature is generally from −5° to 120°C and preferably from 0° to 80°C depending on the amine used. The reaction temperature is dependent on the basicity of the amine, on the solvent used and on the substituent $R^2$ in the benzoxazone (II).

Particularly good yields of products (I) are obtained when the reaction of the benzoxazone (II) with the amine is carried out in a strongly polar water-miscible aprotic solvent in the presence of an aliphatic carboxylic acid such as formic acid, acetic acid, propionic acid or oxalic acid and for this reason reaction of (II) with (III) in such solvent mixtures is preferred.

The amount of carboxylic acid may be up to 40% by weight based on the amine.

The products of the process, in cases when water-miscible solvents are used, may be precipitated by pouring into dilute mineral acids and separated from the aqueous phase.

In the case of reaction mixtures which are not miscible with water the products may for example be precipitated by adding a diluent which does not dissolve the amide (I) and the precipitate may be separated by a conventional method from the organic phase and processed. Solvents which are volatile in steam may be removed by blowing in steam. In cases when the small amount of 1-amino-anthraquinone-2-carboxylic acid contained in the product is troublesome it may be removed by simply stirring with dilute aqueous alkali solution, preferably with a dilute solution of sodium carbonate at ambient temperature. The carboxylic acid present passes into solution.

1,2-dihydro-7,8-diphthaloyl-3,1,4-H-benzoxazone-4 of the formula (II) required as starting material may be prepared for example as described in BIOS Report, 987, page 17 or FIAT Final Report 1313, II, page 70, by reaction of 1-aminoanthraquinone-2-carboxylic acids with paraformaldehyde in a protic solvent such as concentrated sulfuric acid, phosphoric acid or also glacial acetic acid under dehydrating conditions.

The following Examples illustrate the invention. The parts and percentages given hereinafter are by weight.

EXAMPLE 1

15 parts of 1,2-dihydro-6-nitro-7,8-diphthaloyl-3,1,4-H-benzoxazone-4 is dissolved in 100 parts of dry dimethylformamide. Gaseous ammonia is passed in at 70°C until starting material can no longer be detected by thin layer chromatography; this is the case after about 5 hours. The reaction mixture is poured into dilute hydrochloric acid, suction filtered, washed until neutral and dried. 11.2 parts of the carboxamide of the formula:

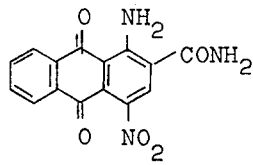

is obtained in the form of a reddish brown powder.

EXAMPLE 2

10.5 parts of n-propylamine is dripped in one hour at 35°C into a mixture of 100 parts of dimethylformamide, 18.0 parts of 1,2-dihydro-7,8-diphthaloyl-3,1,4-H-benzoxazone-4 and 5 parts of glacial acetic acid and the whole is stirred at this temperature for another 4 hours after which the reaction mixture is poured into dilute hydrochloric acid at ambient temperature. The precipitate is suction filtered and washed with water until neutral.

The filter cake is introduced into 1.5% sodium carbonate solution and stirred for 1 hour at room temperature. The product is suction filtered, washed until neutral and dried. The yield is 16.4 parts of the amide of the formula:

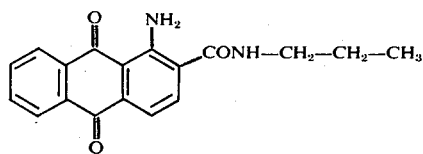

in the form of a brown powder.

EXAMPLE 3

13.5 parts of n-butylamine is dripped in 1 hour at 45°C into a mixture of 24.3 parts of 1,2-dihydro-6-bromo-7,8-diphthaloyl-3,1,4-H-benzoxazone-4, 125 parts of dimethylformamide and 5 parts of glacial acetic acid. The whole is stirred for another 4 hours at the said temperature and the mixture is then poured at ambient temperature into dilute hydrochloric acid. The precipitate is suction filtered and washed with water until neutral.

The filter cake is introduced into 1.5% sodium carbonate solution and the whole is stirred at ambient temperature for one hour. It is then suction filtered and the residue is washed until neutral and dried. The yield is 22.6 parts of a pale red powder which consists of the compound of the formula:

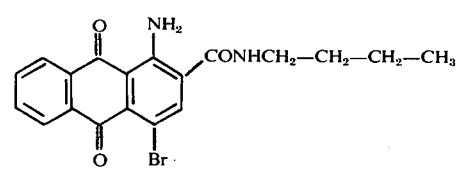

EXAMPLE 4

The procedure described in Example 3 is repeated except that 13.5 parts of isobutylamine is dripped into 18.0 parts of 1,2-dihydro-7,8-diphthaloyl-3,1,4-H-benzoxazone-4.

The yield is 18.3 parts of a reddish brown powder consisting of the compound of the formula:

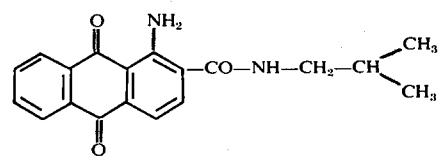

EXAMPLE 5

13.6 parts of n-hexylamine is dripped in 60 minutes at 45°C into a mixture of 100 parts of pyridine, 21.2 parts of 1,2-dihydro-6-nitro-7,8-diphthaloyl-3,1,4-H-benzoxazone-4 and 5 parts of glacial acetic acid, the whole is stirred at this temperature for another 3 hours and the mixture is poured at room temperature into dilute sulfuric acid. The precipitate is suction filtered and washed with water until it is neutral. The filter cake is introduced into 1.5% sodium carbonate solution and the suspension is stirred for 1 hour at ambient temperature. It is then suction filtered, washed until neutral and dried. 23.0 parts of a red powder is obtained which consists of the compound of the formula:

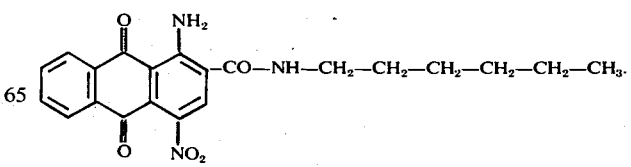

EXAMPLE 6

23.0 parts of β-ethylhexylamine is dripped in 1 hour at 45°C into a mixture of 100 parts of N-methylpyrrolidone-2, 24.3 parts of 1,2-dihydro-6-bromo-7,8-diphthaloyl-3,1,4-H-benzoxazone-4 and 5 parts of propionic acid, the whole is stirred at this temperature for another 3 hours and then the mixture is poured at ambient temperature into dilute hydrochloric acid. The precipitate is suction filtered and washed with water until it is neutral.

The filter cake is introduced into 1.5% sodium carbonate solution and the suspension is stirred for 1 hour at ambient temperature. The whole is then suction filtered, washed until neutral and dried. The yield is 26.6 parts of a red powder which consists of the compound of the formula:

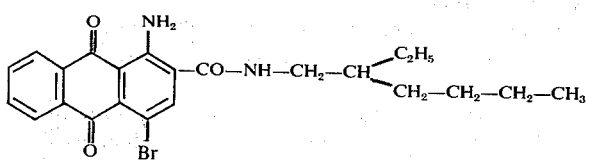

EXAMPLE 7

The procedure described in Example 5 is repeated but 12 parts of γ-ethoxypropylamine is added as the amine.

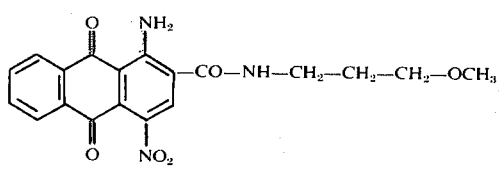

EXAMPLE 8

The procedure described in Example 6 is repeated but 13.5 parts of β-ethoxyethylamine is used as the amine. The yield is 22.0 parts of the amide of the formula:

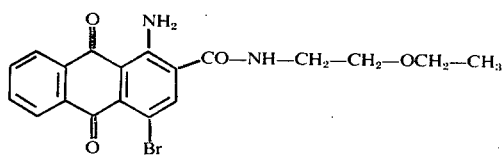

in the form of a red powder.

EXAMPLE 9

The procedure described in Example 2 is repeated but 11.0 parts of ethanolamine is added as the amine. The yield is 16.2 parts of a brown powder of the formula:

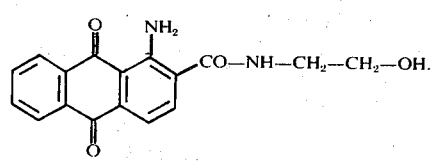

EXAMPLE 10

17.7 parts of β-(β'-hydroxyethoxy)-ethylamine is added at 45°C to a mixture of 100 parts of dimethylformamide, 21.2 parts of 1,2-dihydro-6-nitro-7,8-diphthaloyl-3,1,4-H-benzoxazone-4 and 5 parts of propionic acid in 1 hour while stirring, the whole is stirred at this temperature for another 4 hours and the mixture is poured at ambient temperature into dilute hydrochloric acid. The precipitate is suction filtered and washed with water until it is neutral.

The filter cake is stirred at ambient temperature into 1.5% sodium carbonate solution. It is then suction filtered, washed until neutral and dried. The yield is 24.4 parts of the compounds of the formula:

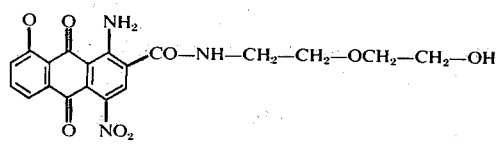

in the form of a red powder.

EXAMPLE 11

The procedure described in Example 2 is repeated but 25.0 parts of β-phenylpropylamine is used as the amine. The yield is 21.0 parts of the compound of the formula:

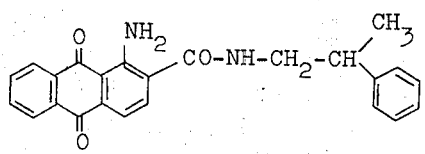

in the form of a brown powder.

EXAMPLE 12

The procedure described in Example 10 is followed but 17.5 parts of cyclohexylamine is used as the amine. After processing 20.8 parts of the compound of the formula:

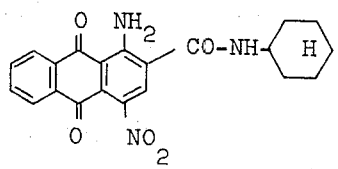

is obtained in the form of a red powder.

EXAMPLE 13

Gaseous ammonia is passed at 0°C into a mixture of 100 parts of dimethylformamide, 20 parts of 1,2-dihydro-6-cyclohexylamino-7,8-diphthaloyl-3,1,4-H-benzoxazone-4 and 5 parts of glacial acetic acid until starting material can no longer be detected by thin layer chromatography. This takes about 3 hours. The reaction mixture is poured into dilute hydrochloric acid, suction filtered, washed with water until neutral and dried. 18.9 parts of the carboxamide of the formula:

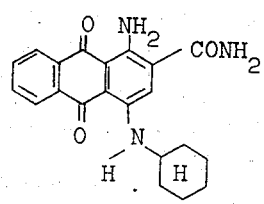

is obtained.

EXAMPLES 14 TO 29

The amines specified below are reacted according to Examples 2, 3, 5, 6, or 10 with the benzoxazone of the formula:

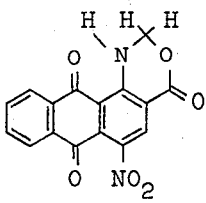

1-amino-4-nitroanthraquinone carboxamides of the formula:

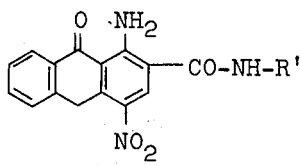

in which R' has the meaning specified in the Table are obtained in the form of red powders.

| Example | Amine | R' |
|---|---|---|
| 14 | methylamine | —CH₃ |
| 15 | n-amylamine | —(CH₂)₄—CH₃ |
| 16 | isoamylamine | iso—C₅H₁₁ |
| 17 | n-octylamine | n—C₈H₁₉ |
| 18 | γ-hydroxypropylamine | —CH₂—CH₂—CH₂—OH |
| 19 | ε-hydroxypentylamine | —(CH₂)₅—OH |
| 20 | γ-hydroxy-β,β-diethylpropylamine | —CH₂—C(C₂H₅)—CH₂OH |
| 21 | β-butoxyethylamine | —CH₂—CH₂—O—C₄H₉ |
| 22 | γ-methoxypropylamine | —(CH₂)₃—OCH₃ |
| 23 | benzylamine | —CH₂—⟨phenyl⟩ |
| 24 | δ-phenylbutylamine | —(CH₂)₄—⟨phenyl⟩ |
| 25 | γ-phenylbutylamine | —(CH₂)₂—C(=CH₃)—⟨phenyl⟩ |
| 26 | β-phenylethylamine | —CH₂—CH₂—⟨phenyl⟩ |
| 27 | cyclopentylamine | ⟨cyclopentyl-H⟩ |
| 28 | methylcyclohexylamine | ⟨cyclohexyl-H⟩—CH₃ |
| 29 | γ-hydroxy-β,β-dimethylpropylamine | —CH₂—C(CH₃)₂—CH₂OH |

We claim:
1. A process for the production of an amide of 1-aminoanthraquinone-2-carboxylic acid of the formula:

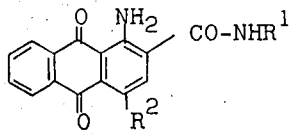

in which R¹ is hydrogen, cycloalkyl of five to eight carbon atoms, alkyl of one to eight carbon atoms or said alkyl substituted once or twice by hydroxyl, alkoxy of one to six carbon atoms, phenyl or said phenyl substituted by alkyl of one to four carbon atoms, alkoxy of one to four carbon atoms, chloro or bromo, and R² is hydrogen, cyclohexylamino, chloro, bromo or nitro, which process comprises:
   reacting a 1,2-hydro—7,8-diphthaloyl-3,1,4-H-benzoxazone -4 of the formula

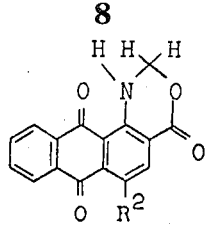

with an amine of the formula:

R¹—NH₂ where R¹ and R² have the above meanings.

2. A process as claimed in claim 1 wherein the reaction is carried out in an excess of the amine which serves at the same time as a solvent.

3. A process as claimed in claim 1 wherein the reaction is carried out in a solvent which is inert under the reaction conditions.

4. A process as claimed in claim 1 wherein the reaction is carried out in a strongly polar water-miscible aprotic solvent.

5. A process as claimed in claim 1 wherein the reaction is carried out in the presence of N-N-dimethylformamide, N,N-dimethylacetamide, N,N-dimethylpropionamide, N,N-diethylformamide, N,N-diethylpropionamide, N,N-diethylacetamide, N-methylpyrrolidone, pyridine or mixtures thereof as a strongly polar water-miscible aprotic solvent.

6. A process as claimed in claim 4 carried out in the presence of an aliphatic carboxylic acid selected from the group consisting of formic acid, acetic acid, propionic acid and oxalic acid.

7. A process as claimed in claim 5 wherein the reaction is carried out in the presence of an aliphatic carboxylic acid selected from the group consisting of formic acid, acetic acid, propionic acid and oxalic acid.

8. A process as claimed in claim 5 carried out in the presence of acetic acid or propionic acid.

9. A process as claimed in claim 1 wherein the reaction is carried out in the presence of from 2 to 10 moles of amine per mole of 1,2-dihydro-7,8-diphthaloyl- 3,1,4-H-benzoxazole-4.

10. A process as claimed in claim 1 wherein the reaction is carried out at a temperature of from −5° to 120°C.

* * * * *

UNITED STATES PATENT AND TRADEMARK OFFICE
CERTIFICATE OF CORRECTION

PATENT NO. : 3,906,012
DATED : September 16, 1975
INVENTOR(S) : SCHUHMACHER et al It is certified that error appears in the above–identified patent and that said Letters Patent are hereby corrected as shown below:

Column 1, Line 57, delete "... orange of blue hues." and substitute --... orange or blue hues.--

Column 5, after the third line in Example 7, insert -- The yield is 20.6 parts of a red powder of the formula:--

Column 7, Line 67 (Claim 1), delete " reacting a 1,2-hydro-7,8..." and substitute -- reacting a 1,2-dihydro-7,8...--

Signed and Sealed this

Fourteenth Day of September 1976

[SEAL]

Attest:

RUTH C. MASON
*Attesting Officer*

C. MARSHALL DANN
*Commissioner of Patents and Trademarks*